(12) United States Patent
Fritzsching et al.

(10) Patent No.: US 10,898,842 B2
(45) Date of Patent: Jan. 26, 2021

(54) FILTER ELEMENT, IN PARTICULAR FOR GAS FILTRATION

(71) Applicant: Mann+Hummel GMBH, Ludwigsburg (DE)

(72) Inventors: Torsten Fritzsching, Vaihingen (DE); Pedro Miguel Pereira Madeira, Bietigheim-Bissingen (DE); Andreas Franz, Ludwigsburg (DE); Nadine Donauer, Fellbach (DE); Martin Gruber, Gangkofen (DE); Joachim-Paul Krieger, Reisbach (DE); Marcel Holzwarth, Fayetteville, NC (US); Manfred Winter, Bad Rappenau (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 410 days.

(21) Appl. No.: 15/783,542

(22) Filed: Oct. 13, 2017

(65) Prior Publication Data
US 2018/0050296 A1    Feb. 22, 2018

Related U.S. Application Data

(63) Continuation of application No. PCT/EP2016/055833, filed on Mar. 17, 2016.

(30) Foreign Application Priority Data

Apr. 15, 2015   (DE) .................. 10 2015 004 645

(51) Int. Cl.
  *B01D 46/42*   (2006.01)
  *B01D 46/24*   (2006.01)

(52) U.S. Cl.
  CPC ..... *B01D 46/4227* (2013.01); *B01D 46/2414* (2013.01); *B01D 2265/028* (2013.01); *B01D 2275/208* (2013.01)

(58) Field of Classification Search
  None
  See application file for complete search history.

(56) References Cited

U.S. PATENT DOCUMENTS

| 9,638,147 | B2 * | 5/2017 | Hasenfratz | ....... F02M 35/02416 |
| 2008/0135471 | A1 * | 6/2008 | Merritt | ................ B01D 46/527 210/493.4 |
| 2010/0242423 | A1 * | 9/2010 | Morgan | ............... B01D 46/002 55/483 |

(Continued)

FOREIGN PATENT DOCUMENTS

| DE | 202006005012 U1 | 8/2007 |
| DE | 102008063720 A1 | 6/2010 |
| DE | 102011083657 A1 | 3/2013 |

*Primary Examiner* — Bobby Ramdhanie
*Assistant Examiner* — Brit E. Anbacht
(74) *Attorney, Agent, or Firm* — James Hasselbeck

(57) ABSTRACT

A filter element with at least one filter medium body and with a grip configured to hold and guide the filter element is provided. At least one locking element is arranged at the grip and configured to lock the filter element on a receiving filter housing. A filter device with such a filter element has a receiving filter housing to receive the filter element and a cover to secure the locking element in locked position on the filter housing.

11 Claims, 8 Drawing Sheets

(56) References Cited

U.S. PATENT DOCUMENTS

| | | | |
|---|---|---|---|
| 2011/0062072 A1* | 3/2011 | Lucas | B01D 46/0043 |
| | | | 210/315 |
| 2011/0099960 A1 | 5/2011 | Menssen et al. | |
| 2012/0067013 A1* | 3/2012 | Antony | B01D 46/4227 |
| | | | 55/357 |
| 2014/0298612 A1 | 10/2014 | Williams et al. | |
| 2014/0318092 A1* | 10/2014 | Rieger | B01D 46/0005 |
| | | | 55/511 |
| 2015/0013288 A1* | 1/2015 | Hasenfratz | B01D 46/10 |
| | | | 55/497 |
| 2015/0013289 A1* | 1/2015 | Hasenfratz | B01D 46/10 |
| | | | 55/497 |
| 2015/0151233 A1* | 6/2015 | Johnson | B01D 46/0005 |
| | | | 95/273 |
| 2016/0305376 A1* | 10/2016 | Hasenfratz | B01D 46/002 |
| 2017/0056807 A1* | 3/2017 | Klein | B01D 46/522 |

* cited by examiner

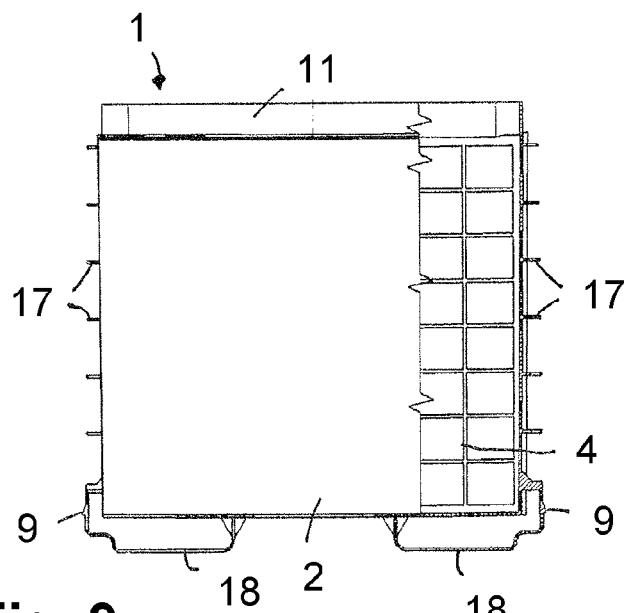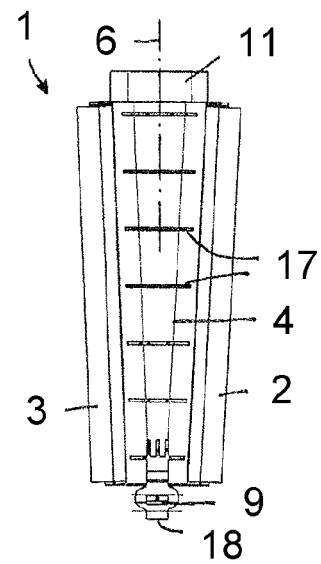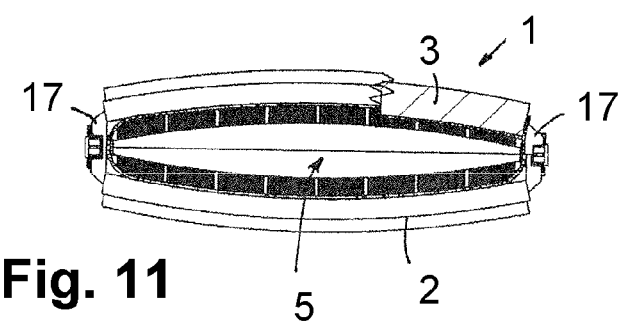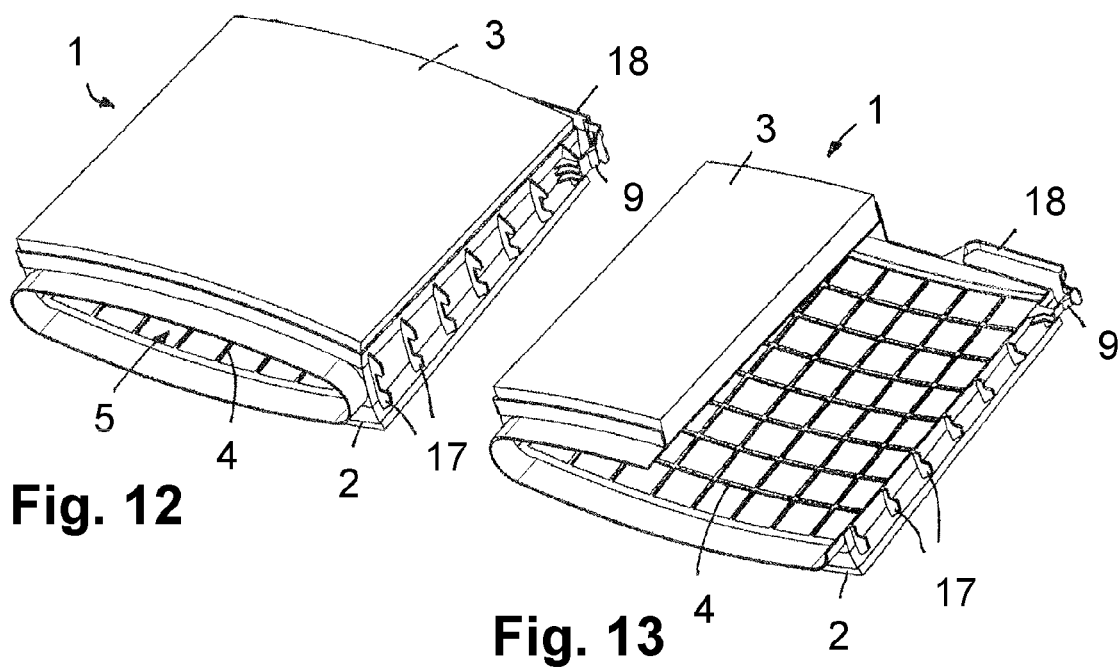

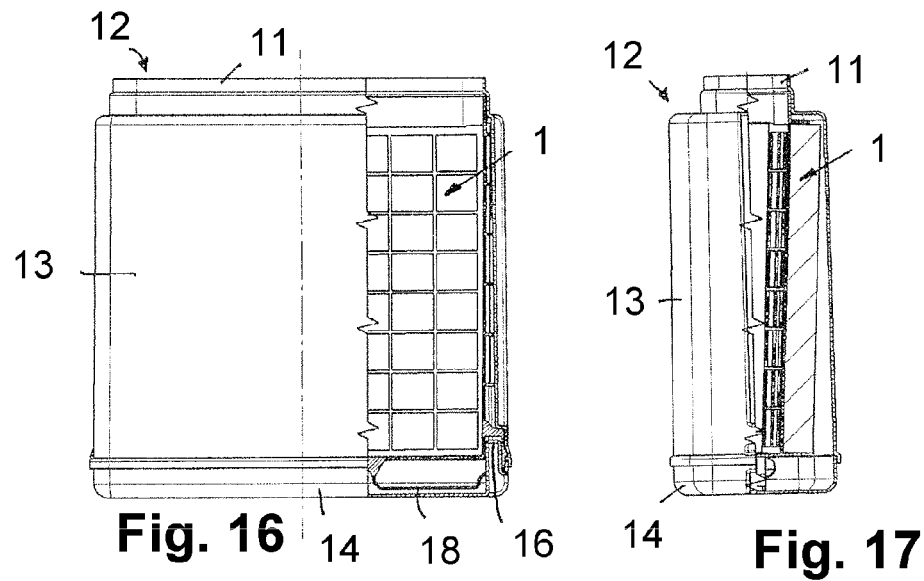
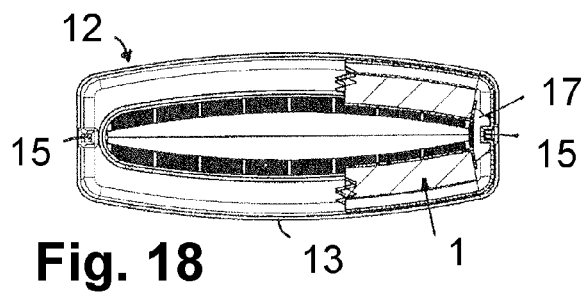
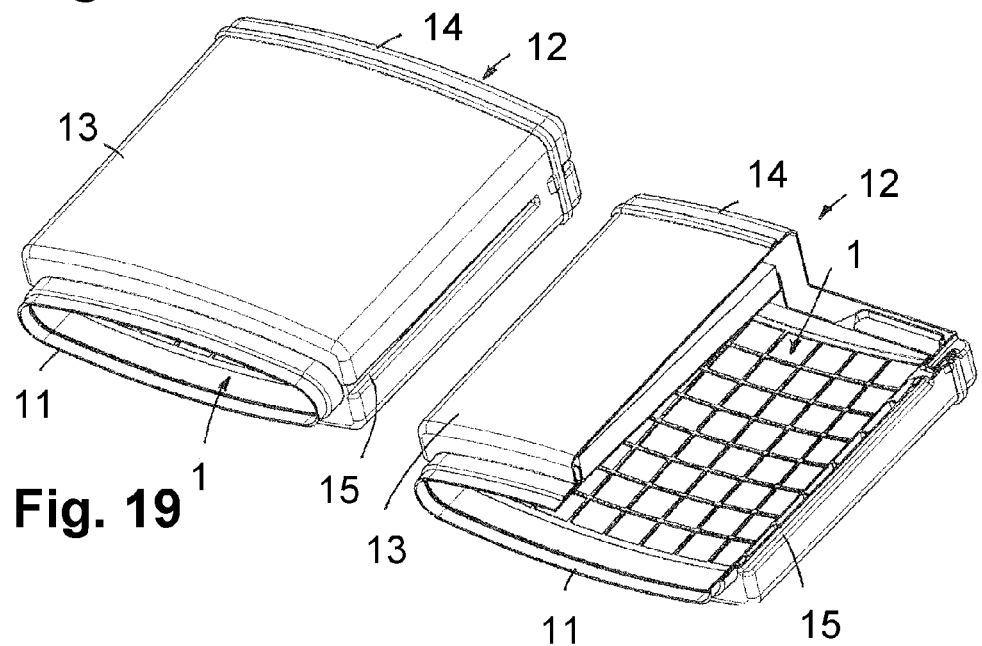

FILTER ELEMENT, IN PARTICULAR FOR GAS FILTRATION

CROSS-REFERENCE TO RELATED APPLICATIONS

This application is a continuation application of international application No. PCT/EP2016/055833 having an international filing date of 17 Mar. 2016 and designating the United States, the international application claiming a priority date of 15 Apr. 2015, based on prior filed German patent application No. 10 2015 004 645.4, the entire contents of the aforesaid international application and the aforesaid German patent application being incorporated herein by reference.

BACKGROUND OF THE INVENTION

The invention concerns a filter element, in particular for gas filtration, with at least one filter medium body and at least one locking element for locking on a filter housing.

Filter elements are known that comprise one or a plurality of filter medium bodies on a support body wherein the filter medium bodies are flowed through by the fluid to be purified. For example, it is known from DE 10 2011 083 657 A1 to arrange two parallelepipedal filter medium bodies, which each are formed as a folded filter, on a common support body in a filter element for a fresh air device of a vehicle, wherein the filter medium bodies delimit between them a clean chamber from which the purified air is discharged axially. In installed position, the filter element is inserted in a receiving filter housing. Due to vibrations and impacts while driving, there is the risk that the filter element is no longer seated in its nominal position in the receiving filter housing and that leakage flows are generated. There is also the risk of malfunctions in case of improper installation of the filter element in the filter housing.

Moreover, it is known to injection mold onto a sealing element on the filter element radially projecting knobs with which the filter element is then held with a clamping force in the filter housing. The knobs hold the filter element at a defined spacing to the filter housing and prevent also that the filter element accidentally falls out when opening the housing cover (DE 10 2010 014 277 A1).

SUMMARY OF THE INVENTION

The invention has the object to provide with simple constructive measures a filter element that can be easily handled and securely received in a filter housing.

This object is solved according to the invention with a filter element comprising at least one filter medium body and at least one locking element for locking on a receiving filter housing, wherein the locking element is arranged at a grip for holding and guiding the filter element.

The dependent claims provide expedient further embodiments.

The filter element according to the invention is used preferably for gas filtration, for example, for filtration of the combustion air for an internal combustion engine or for purifying the fresh air supplied to cabins, for example, vehicle interiors. The filter element can however be used also for filtration of liquids.

The filter element is provided with a locking element with which the filter element can be locked on a receiving filter housing. The locking element is arranged at a grip which serves for holding and guiding the filter element.

This embodiment has the advantage that two different functions are combined in the component that comprises the locking element and the grip. The locking element ensures in installed position a precisely defined installation position of the filter element in the receiving filter housing. Also, the installed position is maintained even during ongoing operation despite vibrations and impacts because the locking action between the locking element and a counter locking element on the filter housing permanently secures the relative position of the filter element relative to the receiving filter housing. Moreover, it is advantageous that the locking action upon insertion of the filter element into the filter housing is noticed by the technician because the locking action is accompanied by a corresponding noise or a noticeable clicking and this indicates to the technician that the final installation position of the filter element in the filter housing has been reached.

The grip facilitates also handling of the filter element. The insertion of the filter element into the filter housing as well as the removal of the filter element from the filter housing are simplified. Due to the proximity of the grip to the locking element, the locked position can be reliably reached and, as needed, the locking action can also be unlocked again.

According to an advantageous embodiment, the locking element and the grip form a one-piece common component. The locking element, as needed, can be arranged on the grip, for example, in the embodiment of the grip as a bracket. However, it is also possible that the grip occupies one part of the component and the locking element a further part of the component, wherein grip and locking element advantageously are arranged adjacent to each other.

According to an alternative embodiment, grip and locking element are not embodied as a one-piece configuration but as separate components which however are fixedly joined. For example, the locking element can be fastened as a separate component to a grip component.

Locking element and grip project preferably past the filter medium body of the filter element. In this context, an axial as well as a radial projection is conceivable relative to the longitudinal axis of the filter element relative to which the flow through the filter element occurs in transverse direction. As an alternative to this, locking element and grip do not project past the filter medium body of the filter element; instead, the locking element and grip are arranged within the outer wall surface of the filter medium body.

According to a further expedient embodiment, the component which comprises the locking element and the grip is elastically deformable. In this way, in particular reaching of the locked position as well as reliably maintaining the locked position and also, as needed, unlocking the locked position is enabled. The component with locking element and grip is embodied, for example, plate-shaped or tab-shaped and has, transverse to the plate plane or transverse to the longitudinal extension of the tab, a bending capability in the elastic range. For reaching the locked position, the component is elastically bent; upon reaching the locked position, the component snaps back again under the action of elastic forces into its initial position so that the locking element is in the locked position. Upon force introduction in a direction opposite to the installation direction of the filter element into the filter housing, the grip elastically deforms and thus unlocks the locking element from the locked position.

According to a further expedient embodiment, on diametrically opposed sides of the filter element a component with a grip and a locking element is provided, respectively. The grips including locking elements on the opposed filter element sides facilitate handling and enable a uniform, symmetric support action and locking action in the receiving filter housing.

According to a further expedient embodiment, the grip is embodied as an ergonomic structure in the component, for example, as a recess, for example, in the form of a grip depression, or as a cutout, for example, in the form of a grip ring. The ergonomic structure can however be embodied also as a projection by which the component can be gripped.

In any case, it is expedient that the grip and the locking element do not coincide but are formed as separate functional parts. The grip and the locking element are arranged adjacent to each other, as needed, immediately adjacent to each other or at a spacing to each other. In any case, it is however expedient to provide a component in the form of a support component on which the grip as well as the locking element are arranged.

The component with the grip and the locking element, according to a further expedient embodiment, can be arranged on a support body of the filter element which is the support of the filter medium body on which the filtration is taking place. The support body is embodied, for example, as a support frame with stays between which flow openings for the fluid are located. The component with grip and locking element is formed, for example, as one piece together with the support body and extends either axially in longitudinal direction or in radial direction on the support body. Moreover, embodiments are also possible in which the component with grip and locking element is designed as a separate component which, however, is connected with the support body.

It is also possible, in an alternative embodiment, to arrange the component with locking element and grip on another part of the filter element, for example, on an end disc of the filter element which is arranged at the axial end face of a hollow cylindrical filter medium body. In a further embodiment, the component with grip and locking element is located on a sealing part, for example, on a circumferentially extending seal, wherein the seal, for example, is joined as a sealing foam with the filter element and the sealing foam is injection molded around the component. The sealing foam, for example, is injection molded onto the filter medium body, onto an end disc or onto the support body.

According to a further expedient embodiment, the component with the grip and the locking element is located adjacent to an end face of the filter element. The filter element is inserted, preferably with the opposed end face leading, into the receiving filter housing and, in the process, can be held and guided by the grip. Upon reaching the installed position, the locking element locks at the counter locking element.

According to a further expedient embodiment, on the filter element at least one, as needed, a plurality of additional guide elements are provided, for example, in the lateral area, which also ensure a sufficient guiding action during the insertion movement of the filter element into the receiving filter housing. The guide elements can be extending, as needed, in longitudinal direction of the filter element with which the insertion direction is coinciding.

According to a further advantageous embodiment, the locking element is provided on a locking tab which is preferably formed as one piece together with the component of the grip but can deform elastically relative to this grip component. The locking tab is connected with one end to the grip component so that the other free end can be pivoted or deformed relative to the grip component plane so that the locking element can move between locked and unlocked position.

According to a further expedient embodiment, the grip is embodied in a bracket shape wherein both bracket ends are connected with a component of the filter element, in particular with the support body that receives and supports one or a plurality of filter medium bodies. The bracket-shaped grip can be elastically deformed in the grip plane in axial direction and/or transverse to the longitudinal axis so that also the locking element arranged on the bracket-shaped grip is moved between locked and unlocked position.

According to a further expedient embodiment, the filter medium body at least over sections thereof is curved. The curvature is preferably convexly embodied relative to the exterior side of the filter element wherein, as needed, also concave embodiments are conceivable. The curved filter medium body is preferably supported by the support body.

The filter element comprises either a filter medium body or, according to a further expedient embodiment, a plurality of filter medium bodies which advantageously delimit between them a flow space for the fluid. The flow space is preferably configured as a clean chamber and is delimited by the outflow sides of the filter medium bodies. In case two or a plurality of filter medium bodies are arranged on the support body, embodiments are conceivable in which the filter medium bodies in circumferential direction adjoin each other immediately and in this way completely enclose the flow space as well as embodiments with a gap between neighboring filter medium bodies. Moreover, embodiments are possible in which the filter element has a round cross section and in particular is hollow cylindrical, wherein in this case the flow is preferably radial from the exterior to the interior and the purified fluid is discharged axially from the internally positioned clean chamber. Possible is however also a non-round cross section shape of the filter element, for example, a flattened oval or approximately elliptical cross section shape.

The filter device which comprises the filter element according to the invention comprises the filter housing for receiving the filter element. Preferably, a cover is attachable to the filter housing so that the filter element in the filter housing is enclosed flow-tightly. In the filter housing, at least one counter locking element can be arranged with which the at least one locking element on the filter element can be brought into locking engagement. By means of the locking connection between filter element and filter housing that is produced by the locking element, the filter element is fixed within the filter housing, in particular arrested perpendicular to the longitudinal axis or installation direction. In this way, the cover can be particularly easily attached.

According to an advantageous embodiment, the cover serves for securing the locked position of the locking element in mounted position of the filter element. For example, on the cover, preferably on the bottom side of the cover, a projection can be arranged which, when the cover is attached, is resting against the locking element and secures the locking element in the locked position. In this way, it is precluded that the locking element accidentally unlocks its locked position. The projection is advantageously contacting immediately the locking element and supports it against the elastic movement direction. For example, a cutout into which the projection on the cover projects is provided in the component with the grip and the locking element.

BRIEF DESCRIPTION OF THE DRAWINGS

Further advantages and expedient embodiments can be taken from the additional claims, the Figure description, and the drawings.

FIG. 9 shows a further embodiment variant of a filter element with flattened, oval cross section and bracket-shaped grips on an end face wherein on the grips additionally a locking element is arranged;

FIG. 10 is a side of the filter element of FIG. 9.

FIG. 11 is an end view of the filter element of FIG. 9.

FIG. 12 is a perspective view of the filter element of FIG. 9.

FIG. 13 is a perspective view of the filter element of FIG. 9 with filter medium body and support body partially cut away.

FIG. 16 shows a filter device with a filter housing and a filter element according to FIGS. 9 to 15 inserted in the filter housing.

FIG. 17 is a side view of the filter device of FIG. 16.

FIG. 18 is an end view of the filter device of FIG. 16.

FIG. 19 is a perspective view of the filter device of FIG. 16.

FIG. 20 is a perspective view of the filter device of FIG. 16 with filter housing, filter medium body, and support body partially cut away.

In the Figures, same components are provided with same reference characters.

DETAILED DESCRIPTION

Figure 1:
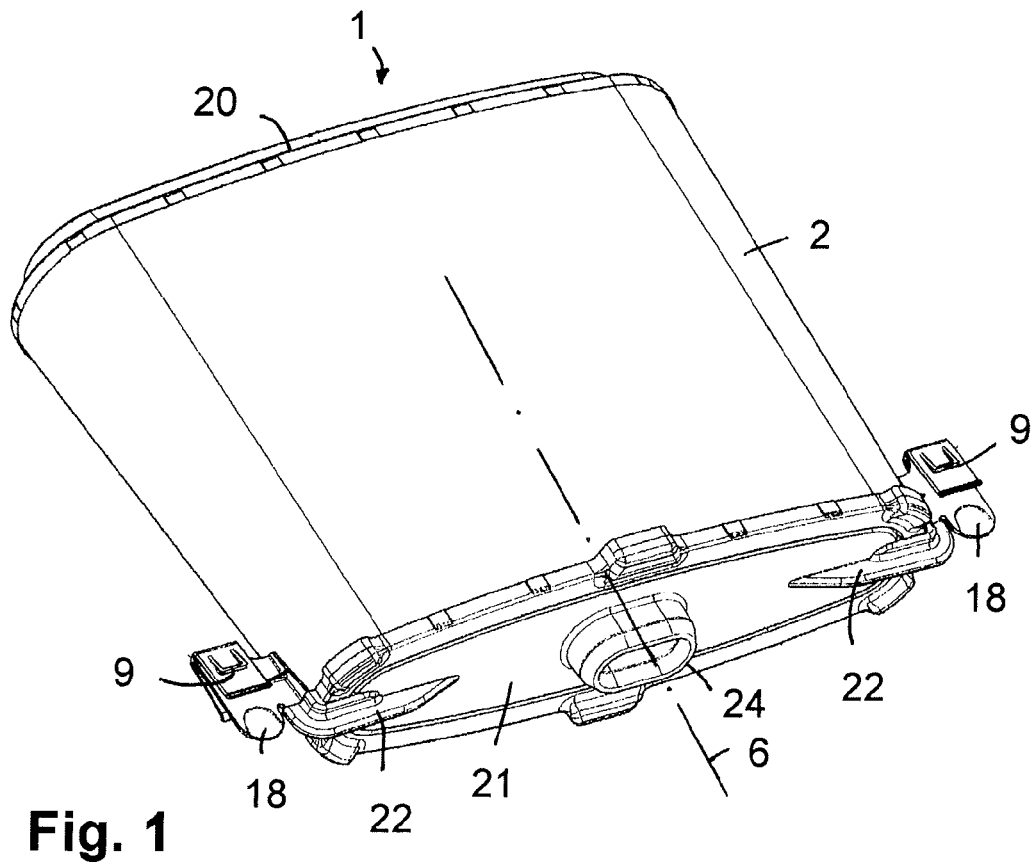
FIG. 1 shows a perspective view of a filter element for gas filtration with flattened, oval cross section, provided with two components arranged in the area of the narrow sides which comprise a grip as well as a locking element for locking on the receiving filter housing.
Figure 2:
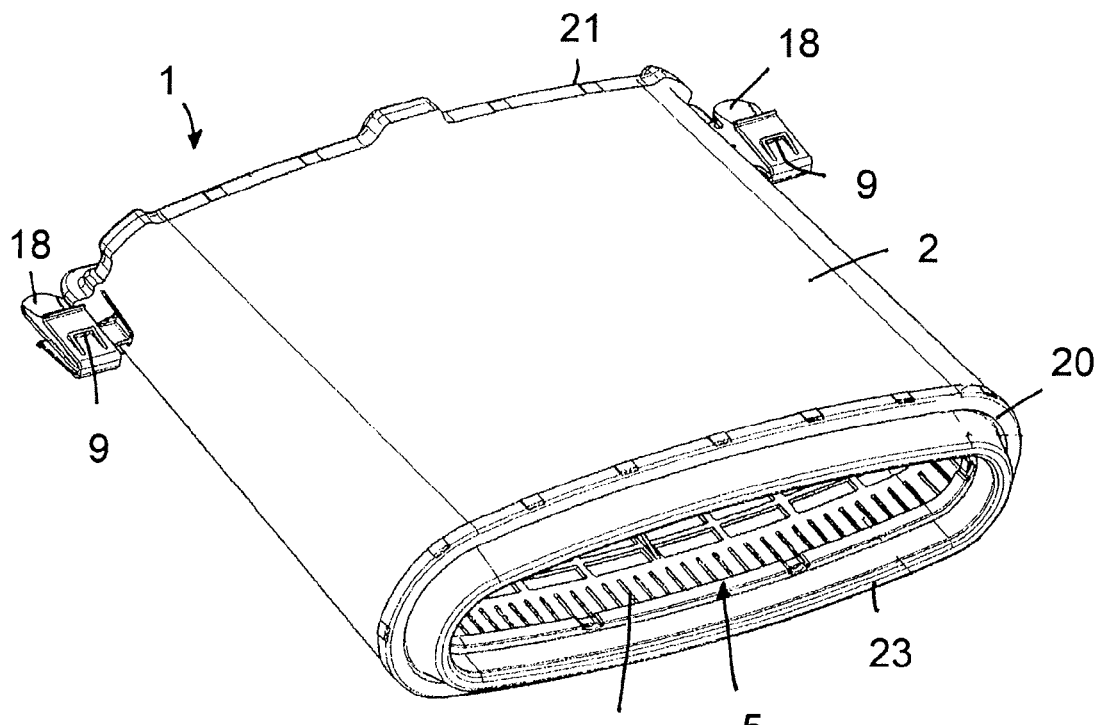
FIG. 2 shows a view of the opposite side of the filter element of FIG. 1.
Figure 3:
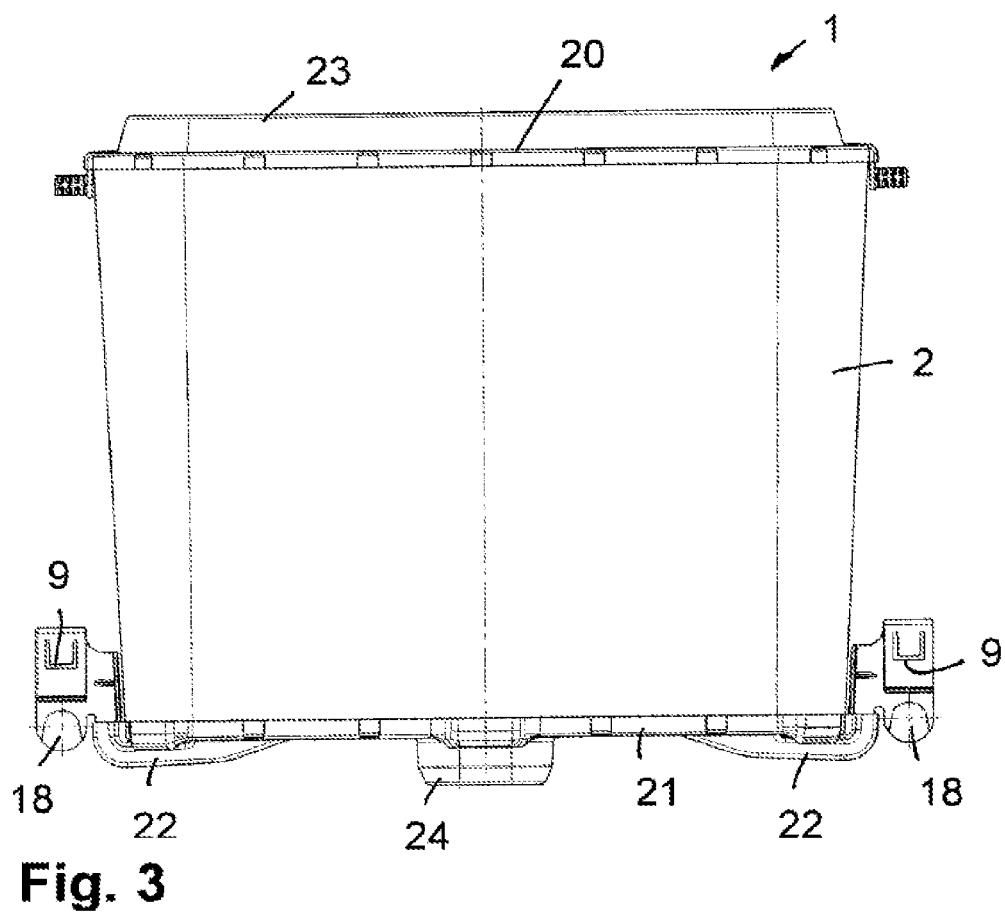
FIG. 3 shows the filter element in side view.

In the first embodiment according to FIGS. 1 through 7, a filter element 1 is illustrated that is employed for gas filtration, in particular for filtration of the combustion air to be supplied to an internal combustion engine in a motor vehicle or commercial vehicle. The filter element 1 comprises a flattened, circumferentially extending, approximately oval filter medium body 2 that is supported and held on an inwardly positioned support body 4 in the form of a support frame. The filter element 1 is flowed through radially from the exterior to the interior by the fluid to be purified so that the inwardly positioned flow space 5 forms the clean chamber from which the purified fluid is axially discharged. The longitudinal axis of the filter element 1 is identified by reference character 6; the flow through the filter medium body 2 is realized transverse to the longitudinal axis 6.

On the axial end faces, end discs 20 and 21 are provided on the filter element 1 wherein in the area of the open end disc 20 a circumferentially extending sealing rim 23 is formed with which the filter element 1 is seated seal-tightly on a tubular socket of a receiving filter housing. By means of this socket, the outflow of the purified fluid from the flow space 5 is realized. On the axially oppositely positioned closed end disc 21, a support contour 24 for clamping the filter element 1 between receiving filter housing 13 and housing cover 14 is arranged.

In the area of opposite narrow sides on the filter element 1, a locking element having a connecting part 22 having a first portion secured directly or indirectly to the filter medium body 2. The connecting part projects radially outwardly beyond a radially outer side of the filter medium body 2. A grip 18 is fixedly secured to a radially outer portion of the connecting part 22, the grip 22A arranged radially outwardly from the at least one filter medium body 2. The grip 18 having a recessed grip depression in or a grip ring formed in the grip 18 and configured for manually gripping the filter element 1 during installation/removal. A U-shaped locking member 27A is fixed to the grip 18, the U-shaped locking member 27A having two legs 27 as tab-shaped components forming two compressible locking tabs 27 which are adapted to be elastically compressed to deflected towards each other. The tab-shaped components with a locking element 9 and a grip 18 are arranged which are located axially adjacent to the closed end disc 21. The components with the locking element 9 and the grip 18 are formed as one piece together with the end disc 21 by means of a connecting part 22. The end disc 21 is embodied of PUR foam and surrounds here the connecting part 22.

As an alternative to this, the tab-shaped components with grip and locking element can also be embodied as one piece together with the support body or, according to a further embodiment, arranged on a sealing element, in particular can be partially embedded by injection molding by the sealing material of the sealing element.

Figure 4:
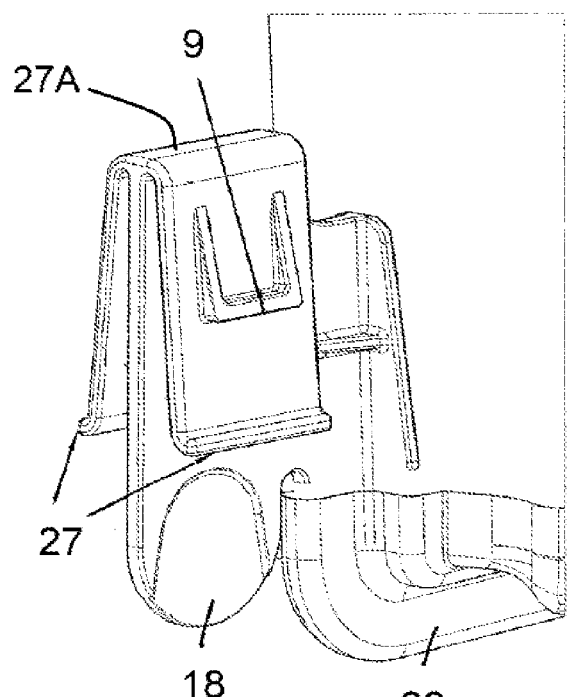
FIG. 4 is in enlarged individual illustration of the component with grip and locking element.
Figure 5:
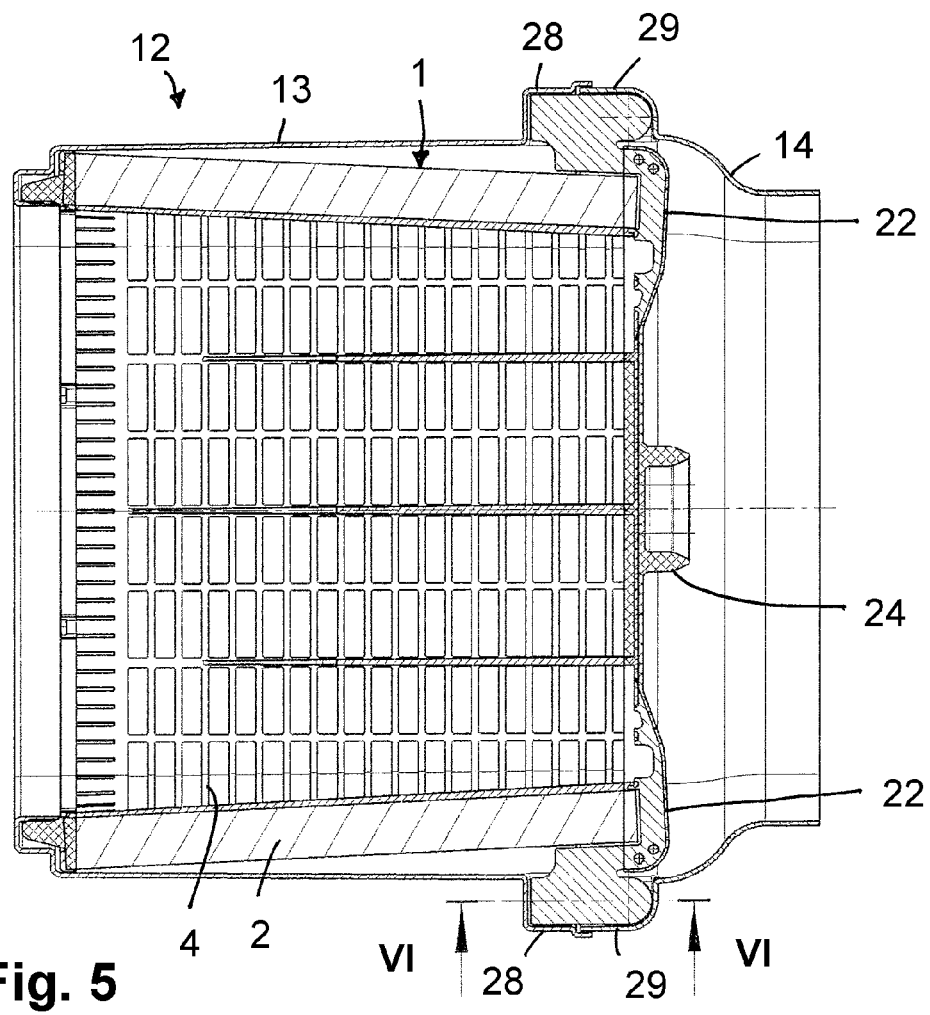
FIG. 5 shows a filter device with a filter housing and an inserted filter element according to the preceding Figures in longitudinal section.
Figure 6:
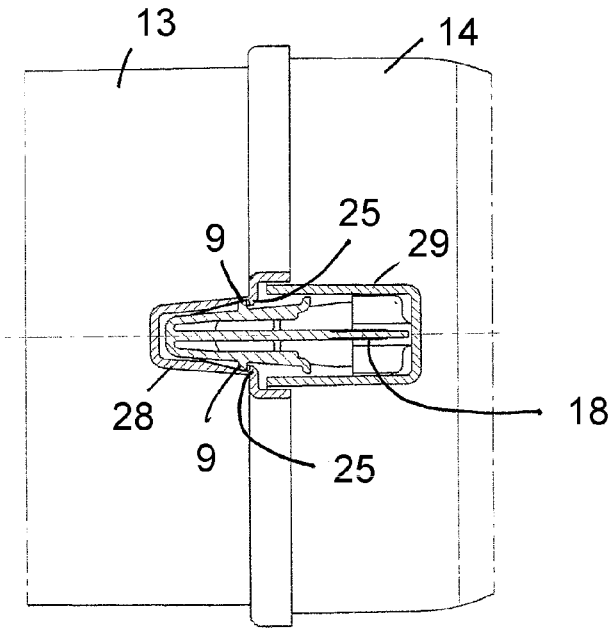
FIG. 6 is an illustration according to section line VI-VI of FIG. 5.
Figure 7:
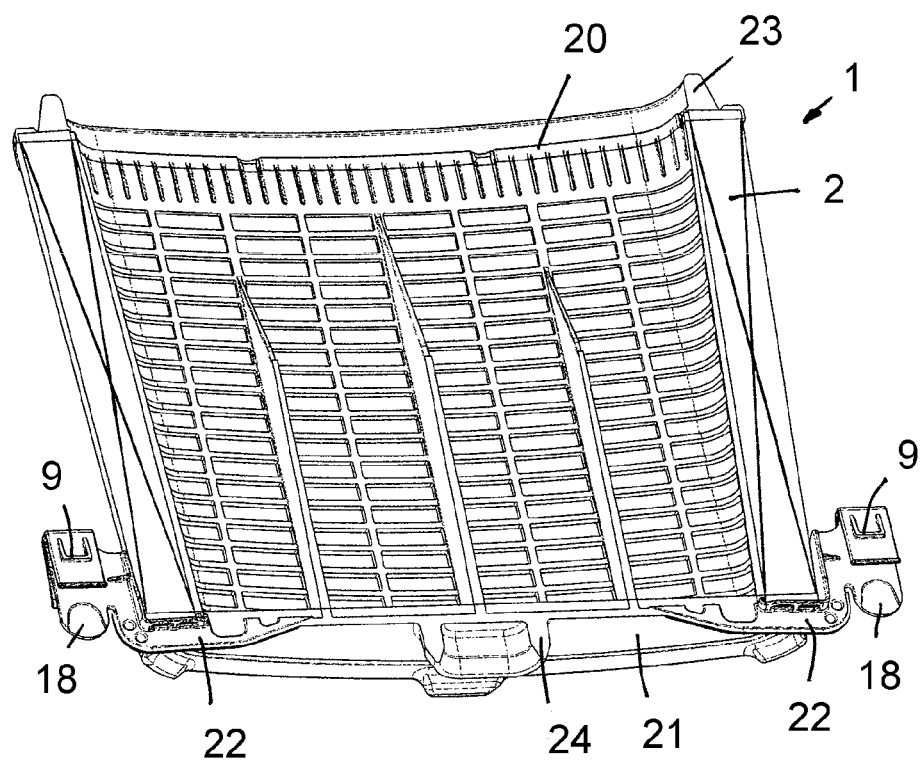
FIG. 7 shows a section through the filter element.

By means of the grips 18 which are designed as recessed grip depressions, the filter element 1 can be manually held and inserted into the receiving filter housing 13 (FIGS. 5, 6). The locking elements 9 lock in the installed position with counter locking elements 25 (FIG. 6) arranged on the filter housing 13. Upon reaching the installed position, the locking elements 9 lock with the counter locking elements 25 so that the filter element 1 is secured with form fit in the receiving filter housing 13 and an accidental detachment from the filter housing is prevented. As can be seen in FIG. 4 in connection with FIG. 6, the locking elements 9 are provided on locking tabs 27 which are formed as one piece together with the element provided with grip 18. The component with the grip 18 comprises on both lateral surfaces a locking tab 27, respectively, each provided with a locking element 9, so that a total of two locking tabs 27, each having a locking element 9, are provided per grip. One end of the locking tabs 27 is embodied monolithic with the likewise tab-shaped component with the grip 18, the other end is exposed so that the locking tabs 27 can be elastically deformed transverse to the plane of the flat component with the grip 18. The free end of the locking tab 27 is bent and enables in this way a manual gripping of the locking tabs, in particular for the purpose of compression in order to unlock the locked position and to be able to remove the filter element 1 from the receiving filter housing 13.

In the receiving filter housing 13, adjacent to the end face on diametrically opposed sides, a radially outwardly extending shoulder 28 is formed which serves for receiving the component with the grip 18 and the locking element 9. On the inner wall of the shoulder 28, the counter locking elements 25 are integrally formed with which the locking elements 9 are in locking engagement.

Also, the cover 14 which is attached to the open end face of the filter housing 13 comprises a corresponding radially widened shoulder 29. Each shoulder 28 on the filter housing 13 has associated therewith a shoulder 29 on the cover 14. The shoulder 29 accommodates the grip 18.

Figure 8:
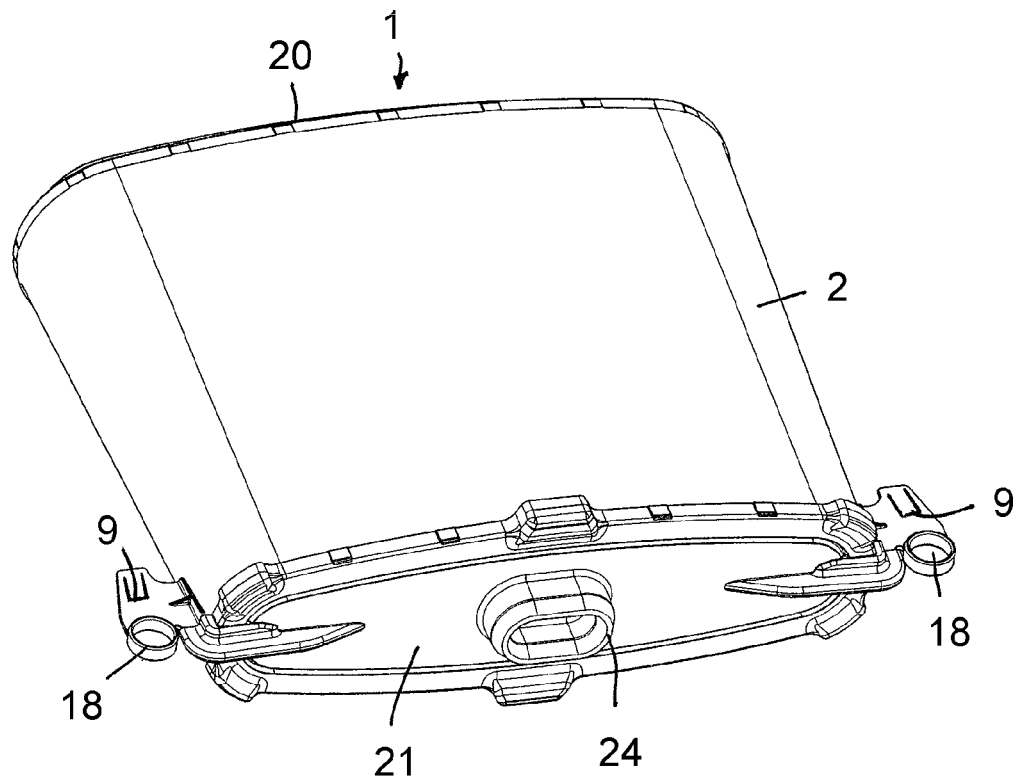
FIG. 8 is an illustration of a filter element corresponding to FIG. 1 in an embodiment variant in which the laterally projecting components with grip and locking element are illustrated showing an alternative embodiment of the grip.

In FIG. 8, an embodiment of the filter element 1 is illustrated whose principal configuration corresponds to that of the preceding embodiment. Different is however the configuration of the grip 18 which is embodied as a grip ring in FIG. 8.

FIGS. 9 to 15 show a filter element 1 in an embodiment variant. FIGS. 16 to 20 show a filter device 12 with a filter housing 13 in which a corresponding filter element 1 is received. The filter element 1 comprises two slightly convexly outwardly curved filter medium bodies 2 and 3 on the longitudinal sides of the support body 4 which is embodied as support frame. The filter element 1 comprises an approximately elliptical or oval flattened cross section.

On the opposite narrow sides, guide ribs 17 that are U-shaped or C-shaped are provided as guide elements on the support body 4. Distributed across the axial length, a plurality of parallel arranged guide ribs 17 are arranged on each narrow side of the support body 4. Into the intermediate space between the guide ribs 17, the inwardly oriented projection 15 on the filter housing 13 is projecting in the mounted state. Since across the axial length a plurality of guide ribs 17 are arranged on the support body 4 of the filter element 1, a guiding action on the projection 15 is accordingly also ensured across the axial length of the filter element 1.

On the side opposite the socket 11, two grips 18 are arranged on the support body 4 which are formed as one piece together with the support body 4. On the exterior sides of each grip 18, a locking element 9 is integrally formed which in the mounted state is contacting preferably the free end face of the filter housing 13 in a locked position. The grips 18 can elastically deform so that the locked position is reached by deformation and the locked position itself, in which the filter element 1 is secured against an accidental axial release from the filter housing 13, is reliably maintained.

Figure 14:
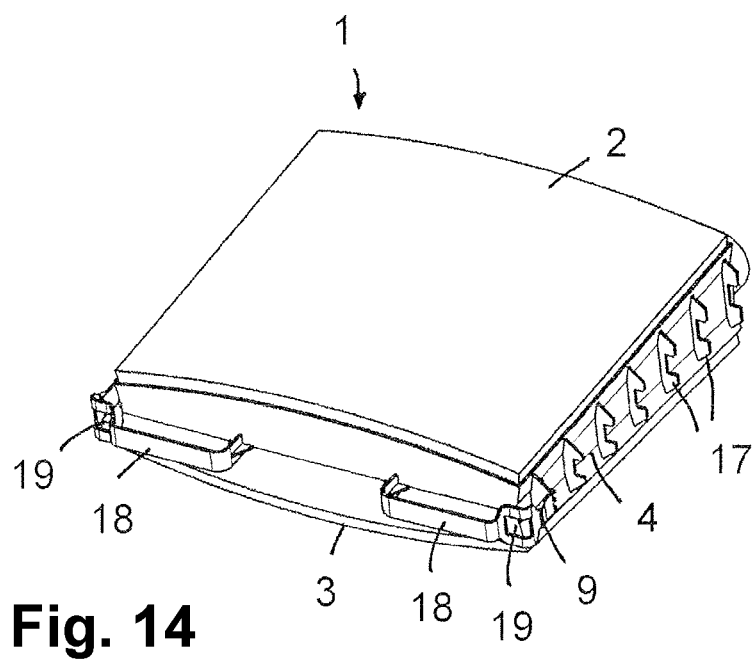
FIG. 14 is another perspective view of the filter element of FIG. 9 showing the end with grips and locking elements.
Figure 15:
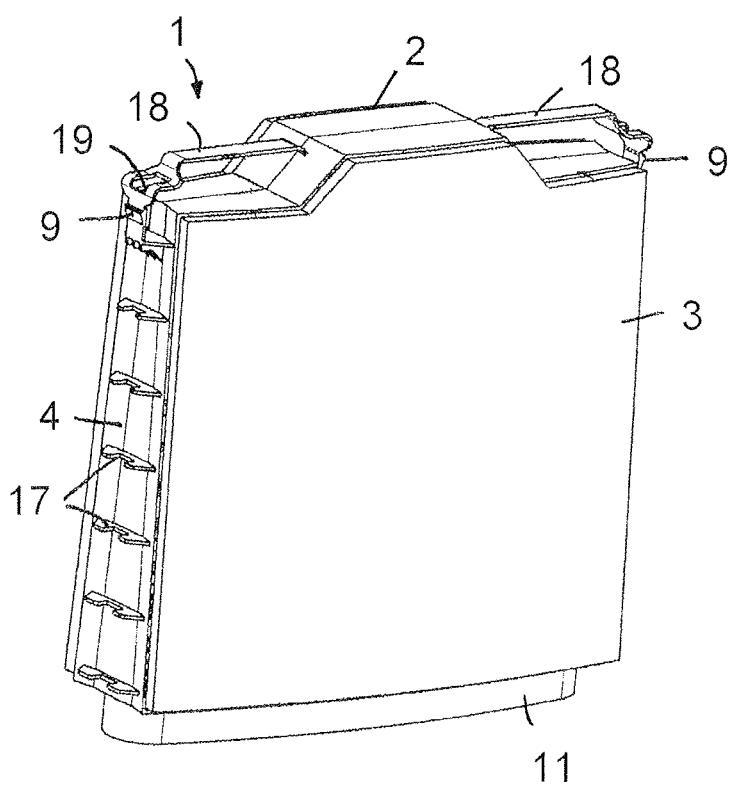
FIG. 15 is another perspective view of the filter element of FIG. 9.

As can be seen in particular in FIGS. 14 and 15, each grip 18 is provided adjacent to its exterior side with a cutout 19 which is neighboring the locking element 9. When the cover 14 is attached, the projection 16 at the inner side of the cover 14 (FIG. 16) projects into the cutout 19 in the grip 18 and prevents in this way that the grip 18 can elastically deform and that the locking element 9 can accidentally reach the unlocked position. When the cover 14 is attached, a reliable non-detachable locking action is thus ensured. Moreover, attachment of the cover 14 is possible only when the locking element 9 is completely locked so that it is ensured that the filter element 1 is arranged in the correct position.

For removal of the filter element 1, the cover 14 is removed and, subsequently, the filter element 1 is lifted or pulled out of the filter housing 13 by the grips 18. In the process, the grips 18 can elastically deform whereby the locking element 9 reaches the unlocked position and a removal of the filter element 1 from the filter housing 13 is possible.

Figure 21:
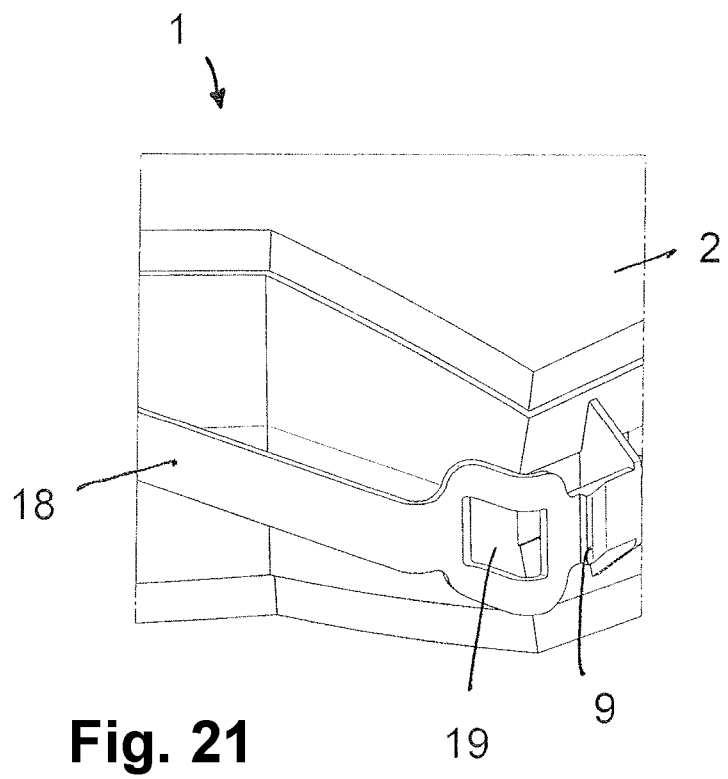
FIG. 21 is an enlarged illustration of the filter element with bracket-shaped grip and a cutout provided in the grip.

In FIG. 21, the cutout 19 in the grip 18 which is integrally formed on the support body 4 is illustrated in an enlarged illustration. The cutout 19 extends across the rim area of the grip 18 and thus partially in the lateral area in which also the locking element 9 is arranged on the grip 18 and partially in the upwardly positioned area at the end face of the filter element. The greater section of the cutout 19 is positioned at the upper end face area. The cutout 19 exhibits a square or slightly rectangular cross section.

Figure 22:
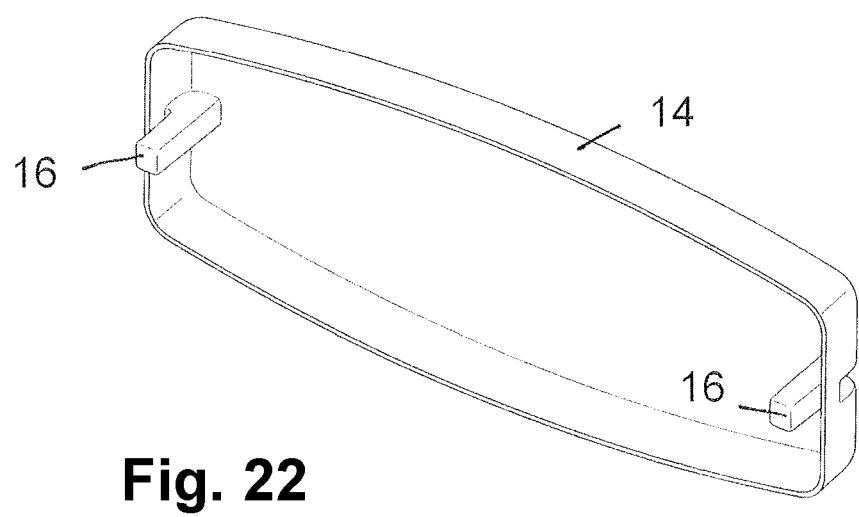
FIG. 22 shows a cover with pin-shaped projections arranged on the inner side of the cover.

As can be seen in the inner view of the cover 14 according to FIG. 22, the pin-shaped projections 16, which project into the cutouts 19 on the grips 18 when the cover is attached, are located on opposite narrow sides of the cover 14. The projections 16 project axially past the lower cover rim. The projections 16 have a cross section which is matched to that of the cutout 19; in the embodiment, the cross section of the projections 16 is square or slightly rectangular.

What is claimed is:

1. A filter element comprising:
   at least one filter medium body of a filter medium and having a first and an opposing second axial end;
   at least one locking member comprising:
   a connecting part (22) having a first portion secured directly or indirectly to the filter medium body (2) at proximate to the first axial end of the filter medium body, the connecting part (22) projecting radially outwardly beyond a radially outer side of the at least one filter medium body (2); and
   a grip member (18) fixedly secured to a radially outer portion of the connecting part (22), the grip member (18) arranged radially outwardly from the at least one filter medium body, the grip member (18) having:
   a recessed grip depression in or a grip ring formed in the grip member (18) and configured for manually gripping the filter element (1) during installation/removal; and
   a U-shaped locking member (27A) fixed to the grip member (18), the U-shaped locking member (27A) having two legs forming two compressible locking tabs (27) which are adapted to be elastically compressed to deflected towards each other:
   wherein the compressible locking tabs (27) of the U-shaped locking member (27A) each have a locking element (9) configured to lockably engage with a counter locking element (25) of a filter housing configured to receive the filter element.

2. The filter element according to claim 1, wherein the at least one locking member is formed as a one-piece common component.

3. The filter element according to claim 2, wherein the grip member is an ergonomic structure of the one-piece common component.

4. The filter element according to claim 1, wherein the compressible locking tabs comprise an outwardly bent free end configured to be gripped,
   wherein the locking elements are integrally formed on the compressible locking tabs.

5. The filter element according to claim 1, further comprising
   a support body, wherein the at least one filter medium body is arranged on the support body.

6. The filter element according to claim 5, wherein the grip member or the U-shaped locking member is formed as one piece together with the support body.

7. The filter element according to claim 5, wherein the support body is a support frame,
wherein the support frame contacts a lateral face of the at least one filter medium body and the support frame supports the at least one filter medium body.

8. A filter device comprising:
a receiving filter housing;
   a filter element comprising:
      at least one filter medium body of a filter medium and having a first and an opposing second axial end;
      at least one locking member comprising:
         a connecting part having a first portion secured directly or indirectly to the filter medium body at proximate to the first axial end of the filter medium body, the connecting part projecting radially outwardly beyond a radially outer side of the at least one filter medium body; and
         a grip member fixedly secured to a radially outer portion of the connecting part, the grip member arranged radially outwardly from the at least one filter medium body, the grip member having:
            a recessed grip depression in or a grip ring formed in the grip member and configured for manually gripping the filter element during installation/removal; and
            a U-shaped locking member fixed to the grip member, the U-shaped locking member having two legs forming two compressible locking tabs which are adapted to be elastically compressed to deflected towards each other;
   wherein the compressible locking tabs of the U-shaped locking member each have a locking element configured to lockably engage with a counter locking element of the filter housing.

9. The filter device according to claim 8, further comprising
a cover configured to attach to the filter housing and secure the at least one locking elements in a locked position.

10. The filter device according to claim 9, wherein the cover comprises a projection arranged on an inner side of the cover,
wherein the projection is resting against the compressible locking tabs at and secures the locking elements in a locked position.

11. The filter element according to claim 1, wherein the locking element is a ramped projection formed on the compressible locking tabs.

* * * * *